(12) United States Patent　　(10) Patent No.:　　US 6,441,530 B1
Petersen　　(45) Date of Patent:　　Aug. 27, 2002

(54) D.C. PM MOTOR WITH A STATOR CORE ASSEMBLY FORMED OF PRESSURE SHAPED PROCESSED FERROMAGNETIC PARTICLES

(75) Inventor: Christian C. Petersen, Sandwich, MA (US)

(73) Assignee: Petersen Technology Corporation, Bourne, MA (US)

( * ) Notice: Subject to any disclaimer, the term of this patent is extended or adjusted under 35 U.S.C. 154(b) by 0 days.

(21) Appl. No.: 09/728,235

(22) Filed: Dec. 1, 2000

(51) Int. Cl.⁷ ................................................ H02K 1/00

(52) U.S. Cl. .................. 310/216; 310/67 R; 310/43; 310/259

(58) Field of Search ................. 310/216, 218, 310/42, 44, 45, 67 R, 254, 258, 259, 209, 208

(56) References Cited

U.S. PATENT DOCUMENTS

| 4,845,837 | A | * | 7/1989 | Lloyd | 29/598 |
| 5,798,583 | A | * | 8/1998 | Morita | 310/42 |
| 6,232,681 | B1 | * | 5/2001 | Johnston et al. | 310/44 |

* cited by examiner

Primary Examiner—Nestor Ramirez
Assistant Examiner—Thanh Lam
(74) Attorney, Agent, or Firm—Mueller and Smith, LPA

(57) ABSTRACT

A d.c. PM motor having a stator core assembly which is formed of a pressure shaped processed ferromagnetic particulate material. The low permeability characteristic of this material is accommodated for by a stator shape which optimizes the efficiency of the coupling of the PM field of a rotor into the stator structure. Efficiency for coupling the applied field into the stator core structure also is enhanced through the utilization of transitions in levels between the induction region of each core component and the field winding support region. A method is described for assembling the stator core assemblies using discrete core component pieces in conjunction with back iron linking components or pieces.

45 Claims, 7 Drawing Sheets

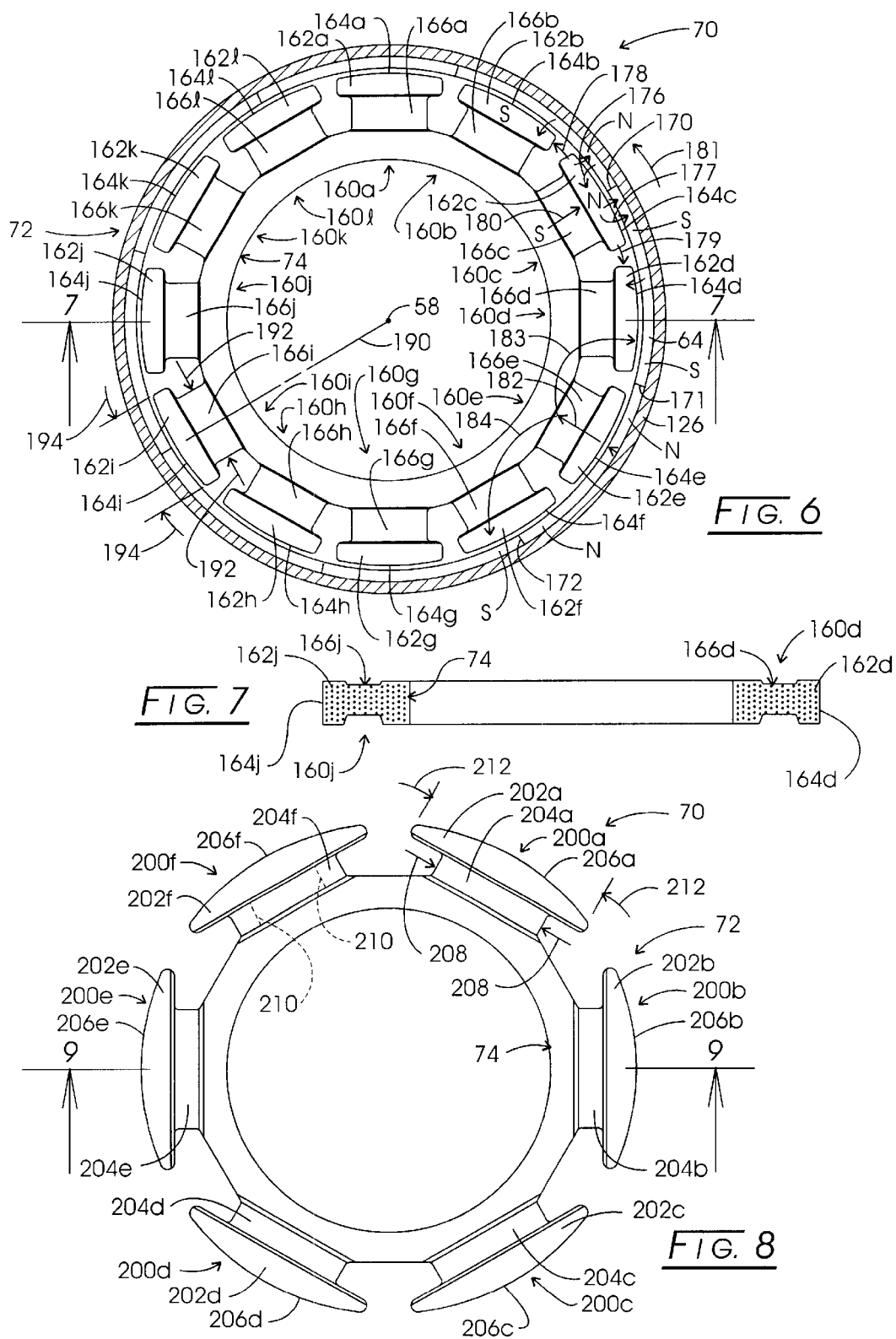

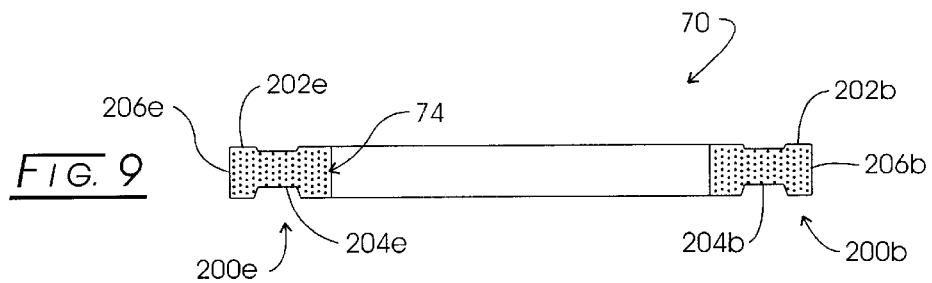
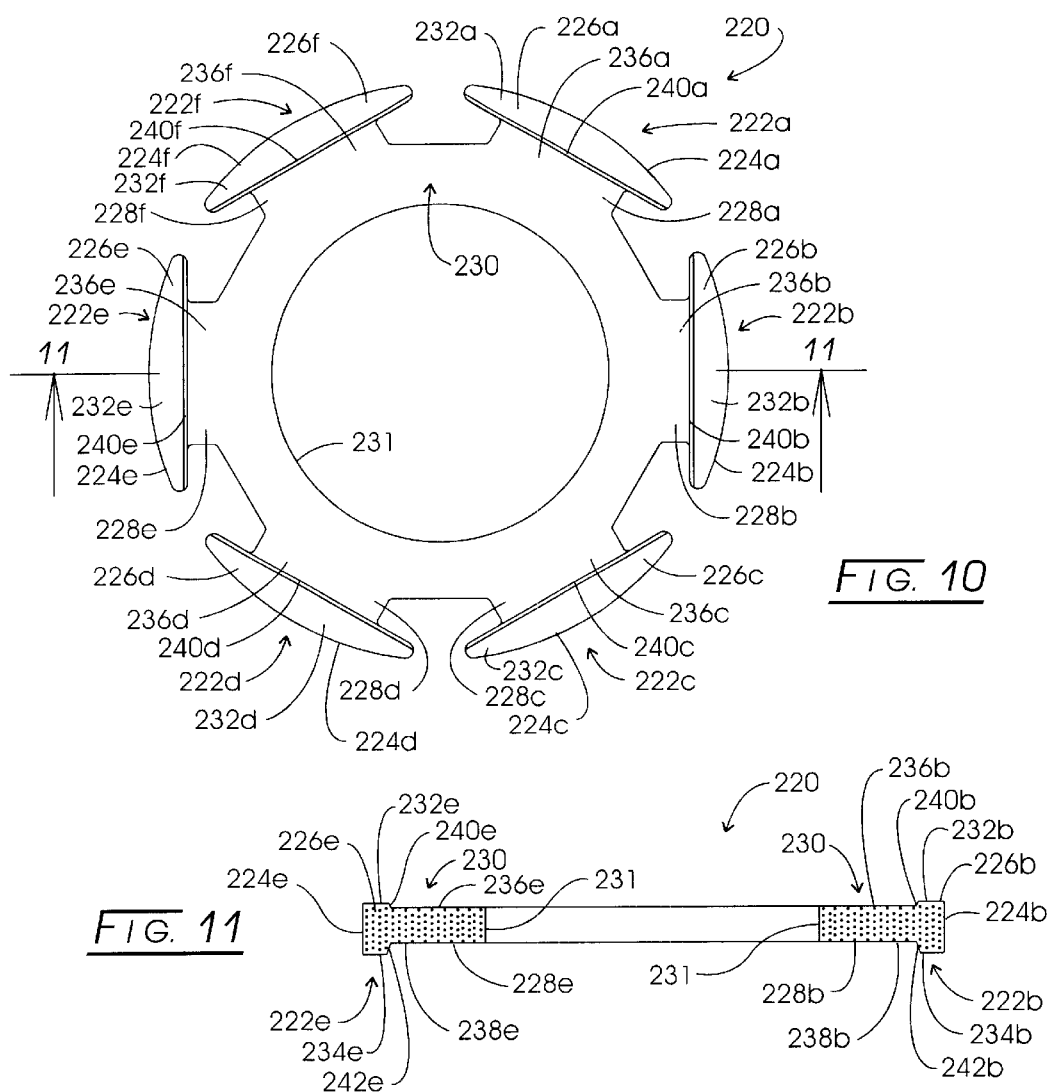

D.C. PM MOTOR WITH A STATOR CORE ASSEMBLY FORMED OF PRESSURE SHAPED PROCESSED FERROMAGNETIC PARTICLES

CROSS-REFERENCE TO RELATED APPLICATIONS

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements particularly necessitated with the introduction of rotating disc memory. For example, detent torque phenomena has been the subject of correction. The phenomena occurs as a consequence of the nature of motors configured with steel core stator poles and associated field windings performing in conjunction with permanent magnets. With such component combinations, without correction, during an excitation state of the motor windings which create motor drive, this detent torque will be additively and subtractively superimposed upon the operational characteristics of the motor output to distort the energized torque curve, increase ripple torque, reduce the minimum torque available for starting and, possibly develop instantaneous speed variations. Such instantaneous speed variations generally have not been correctable by electronics. Particularly over the recent past, the computer industry has called for very low profile motors capable of performing in conjunction with very small disc systems and at substantially elevated speeds.

Petersen, in U.S. Pat. No. 4,745,345, entitled "D.C. Motor with Axially Disposed Working Flux Gap", issued May 17, 1988, describes a PM d.c. motor of a brushless variety employing a rotor-stator pole architecture wherein the working flux gap is disposed "axially" wherein the transfer of flux is parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and efficiency and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the steel core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate segments which rotate about a circular locus of core component defining pole assemblies. The paired permanent magnets are magnetized in a radial polar sense and interact without back iron in radial fashion with three core components of each pole assembly which include a centrally disposed core component extending within a channel between the magnet pairs and to adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Feb. 10, 1995 and entitled "Permanent Magnet D.C. Motor Having Radially-Disposed Working Flux-Gap" describes a PM d.c. brushless motor having outstanding performance characteristics which is producible at practical cost levels commensurate with the incorporation of the motors into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost or, lower energy product permanent magnets may be employed with the motors. See also: Petersen, U.S. Pat. No. 5,874,796, issued Feb. 23, 1999.

Over the years of development of what may be referred to as the Petersen motor technology, greatly improved motor design flexibility has been realized. Designers of a broad variety of motor driven products including household implements and appliances, tools, pumps, fans and the like as well as more complex systems such as disc drives now are afforded a greatly expanded configuration flexibility utilizing the new brushless motor systems. No longer are such designers limited to the essentially "off-the-shelf" motor variety as listed in the catalogues of motor manufacturers. Now, motor designs may become components of and compliment the product itself in an expanded system design approach.

During the recent past, considerable interest has been manifested by motor designers in the utilization of processed ferromagnetic particles in conjunction with pressed powder technology as a substitute for the conventional laminar steel core components of motors. With this technology, the fine particles which are pressed together essentially are mutually electrically insulated. So structured, when utilized as a motor core component, the product will exhibit very low eddy current loss which will represent a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially low as compared with the corresponding tooling required with typical laminated steel fabrication. The desirable molding approach provides a resultant magnetic particle structure that is 3-dimensional magnetically and avoids the difficulties encountered in the somewhat two-dimensional magnetic structure world of laminations. See generally U.S. Pat. No. 5,874,796 (supra).

The high promise of such pressed power components, however, currently is compromised by the unfortunate characteristic of the material in exhibiting relatively low permeability as contrasted at least with conventional laminar core systems. Thus the low permeability has called for 1½ to 2 times as many ampere turn deriving windings. In order to simultaneously achieve acceptable field winding resistance values, the thickness of the winding wire must be increased such that the wire gauge now calls for bulksome structures which, in turn, limit design flexibility. Indeed, designers confronting the permeability values available with processed ferromagnetic particle technology will, as a first inclination, return to laminar structures. This is particularly true where control over the size of the motors is mandated as, for example, in connection with the formation of brushless d.c. motors employed with very miniaturized packaging. However, the disc drive industry now seeks such compact packaging in conjunction with high rotational speeds. In the latter regard, speed increases from around 7200 rpm to 15000 rpm and greater now are contemplated for disc drives which, in turn, must perform with motors the profile of which is measured in terms of a small number of millimeters. In general, lamination-based core structures cannot perform as satisfactorily at the higher core switching speeds involved, while particulate core-based structures are defeated by the size restraints.

BRIEF SUMMARY OF THE INVENTION

The present invention is addressed to PM d.c. motors having stator core assemblies formed of processed ferromagnetic particles and created by molding or pressing procedures. Practical configurations for these motors are developed with architectures which accommodate for the lower permeability characteristics of their stator forming material through the application of a higher level of P.M. induced fields and larger cross sectional area of the winding support region to achieve the required performance comparable to conventional laminated stator core structures. To make optimum use of the form pressed particulate material, a stator assembly shape is provided which maximizes the efficiency of coupling of the permanent magnet field into each stator core component, as well as improves the coupling efficiency of the applied field at the field winding support region. The latter coupling efficiency is developed through the utilization of ramp-shaped transitions from one level at an induction region to a next adjacent level at the field winding support region of each core component of the stator core assembly. Efficiency further is realized by adherence to a criteria wherein the widthwise extent or width of each core component of the stator assembly at the field winding region and the arcuate or circumferential length of the flux interaction surface at each induction region meet a requirement wherein their ratio cannot exceed about 2.5. Enhanced induction of the permanent magnet field at the induction region of each core component is evolved by an enlarged face length or length of the flux confronting surface of each core component taken in parallel with the motor axis. That length will be about coextensive with the corresponding length of the permanent magnet assembly in the motor rotor.

By meeting these design criteria, motors can be designed which meet severe size and/or shape limitations and which may take advantage of the lower eddy current losses evidenced by pressed processed ferromagnetic particulate materials. The resultant stator cores will sustain very high field switching rates without otherwise unacceptable losses, which typically are manifested in excessive and generally unacceptable heat development.

In one approach of the invention, further advantage is taken of these processed ferromagnetic particulate structures in that the stator core assemblies can be formed of discrete core components which are interkeyed to form a plurality of core components interconnected by a back iron assembly formed of the same type material. Alternately the back iron assembly can be formed from stamped laminations albeit with some accompanying increase in losses at higher switching frequencies. Compression stamped laminations Tensioning assemblies are utilized in retaining these assemblies together and further, they can be interkeyed and assembled together with adhesives.

Another feature of the invention is to provide a d.c. motor exhibiting a predetermined torque constant, field winding resistance and functioning air gap radius extending from a motor axis. The motor includes a rotor having a sequence of generally arcuate regions of predetermined magnetization and confronting magnetic surface of principal dimension in parallel with the motor axis. This confronting magnetic surface is located in correspondence with the air gap radius and is rotated about the motor axis. A stator core assembly is provided having spaced core components formed of the noted pressure shaped processed ferromagnetic particles which are generally mutually insulatively associated. Each core component of the stator core assembly is disposed about a radius extending from the motor axis and has a flux interaction surface located adjacent the rotor confronting magnetic surface to define a functioning air gap. The flux interaction surface has a face length parallel with the motor axis and a face width selected to provide a magnetic field coupling induction acting with a selected core component winding support region area and winding turns that corresponds with the predetermined torque constant and field winding resistance. Each core component has the winding support region radially spaced from and in flux transfer communication with the flux interaction surface and has a flux interacting pole region which exhibits a cross-sectional area effective for conveying of confronting magnetic flux and coil generated electromagnetic flux without saturation. The stator assembly includes a back iron assembly formed of pressure shaped processed ferromagnetic particles which are generally mutually insulatively associated. This back iron assembly is radially spaced from and in flux transfer association with each core component winding support region and has cross-sectional area attributes effective for magnetic flux conveyance without saturation. The noted core component flux interaction surface face width has a value less than about 2.5 times the winding region width. A field winding assembly is provided which is configured to exhibit the predetermined field winding resistance and which includes winding components located at each core component, extending in electromagnetic flux coupling relationship about the winding support region, the winding components being controllably electrically excitable for effecting driven rotation of the rotor about the motor axis.

Other objects of the invention will, in part, be obvious and will, in part, appear hereinafter. The invention, accordingly, comprises the method, system and apparatus possessing the construction, combination of elements, arrangement of parts and steps which are exemplified in the following detailed description.

For a fuller understanding of the nature and objects of the invention, reference should be made to the following detailed description taken in connection with the accompanying drawings.

BRIEF DESCRIPTION OF THE DRAWINGS

FIG. 6 is a top view of a stator core assembly shown in connection with a schematic representation of a rotor and showing flux flow paths;

FIG. 7 is a sectional view taken through the plane in 7—7 in FIG. 6;

FIG. 8 is a top view of a second stator core assembly according to the invention;

FIG. 9 is a sectional view taken through the plane 9—9 in FIG. 8:

FIG. 10 is a top view of another stator core assembly embodiment of the invention;

FIG. 11 is a sectional view taken through the plane 11—11 shown in FIG. 10;

DETAILED DESCRIPTION OF THE INVENTION

Figure 1:
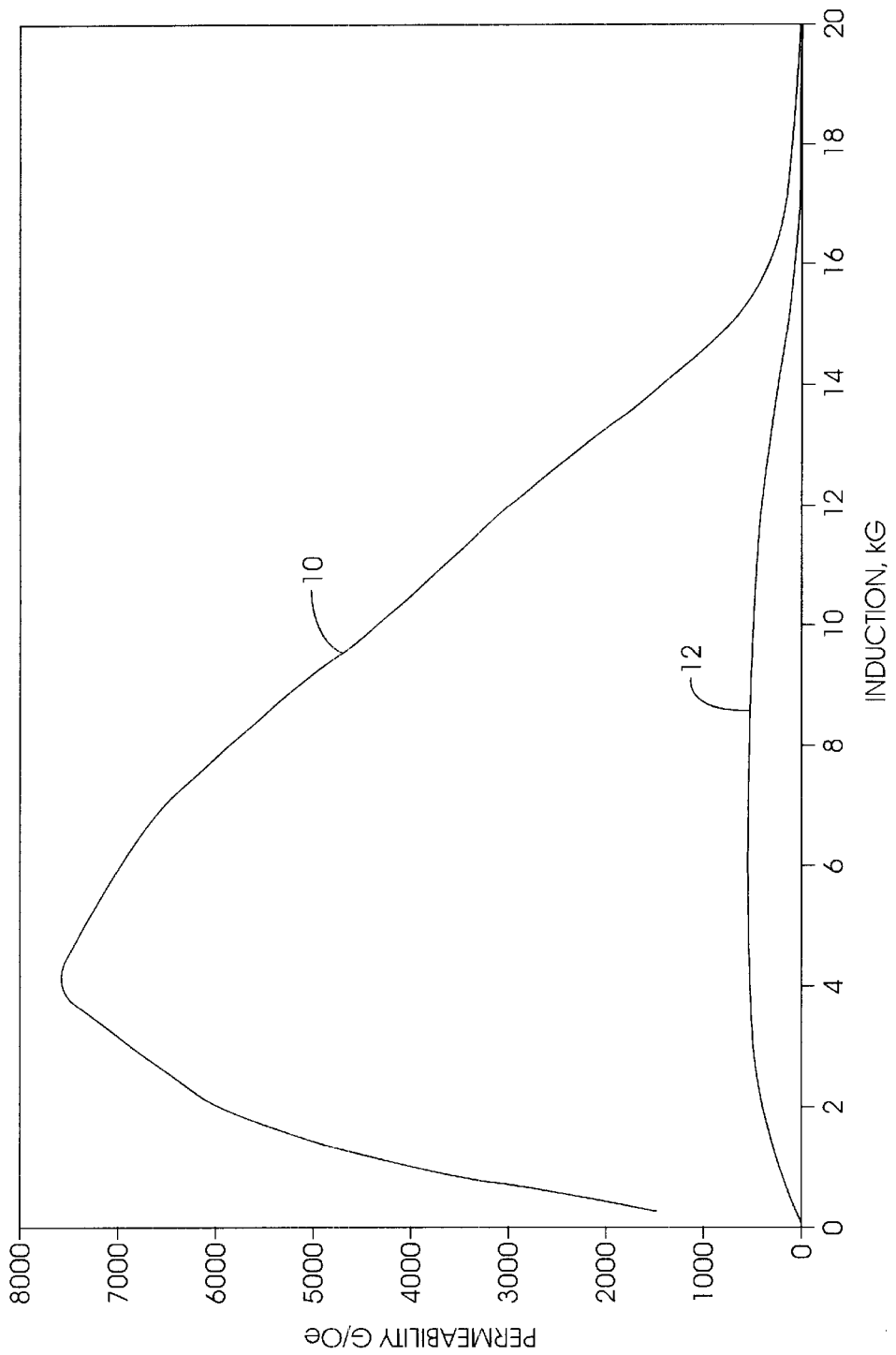
FIG. 1 is a chart demonstrating the variation of permeability between a coventional laminar stator core structure and a stator core structure according to the invention.

In the discourse to follow, the structuring of pressed powder metal (PPM) permanent magnet (PM) d.c. motors according to the invention is evolved in consonance with a discovery that for implementing such motors in a system design approach associated with a product, the designer will necessarily always have a pre-selected or specified torque constant required of the motor to evoke requisite speed, and a field winding resistance which can be tolerated both in terms of electrical circuit requirements and starting torque needs in achieving such speeds at the required load. Additionally, the outside diameter of the motor is often specified which indirectly defines the radius from the motor axis to its functioning or working air gap. These motors all employ stator assemblies which are formed, for example, by pressure shaping processed ferromagnetic particles formed of an iron powder which is coated with an inorganic material. The advantages of being able to use these materials while still meeting system packaging or envelope requirements reside in their net shaping capabilities and lower cost tooling, which cost will be substantially below the tooling required for creating conventional core laminations. While the very low eddy current loss exhibited by stator core components formed with this material is highly advantageous, the permeability parameter for the material, typically expressed in Gauss per Oersted (G/Oe) is remarkably low for currently available soft magnetic materials.

The lower permeability of a resultant stator configured with the processed ferromagnetic particle material is accommodated for through the utilization of a higher applied or electromagnetic field which achieves an adequate level of induction. These materials also exhibit a lower level of maximum induction. In this regard, the highest level of possible induction of the material is lower than that of steel lamination material when utilized in its preferred direction. This means that the powdered material may saturate at a lower flux density. To make optimum use of the processed ferromagnetic particulate material the principal coplanar dimension or face length along the axis of the arcuate flux interaction surface is made as long as possible. In this regard, it is made about the same length taken in the sense of the axis of the motor as the length of the permanent magnets available to be installed in the rotor. The term "about" the same length is utilized inasmuch as it is desirable to permit a slight overlap of the permanent magnet component with respect to that flux interaction surface. Another feature of motors of the invention resides in the arcuate circumferential length of the typically flared flux interaction surface. It is desirable that length be minimized and such minimization can be realized by increasing the number of core components and, typically, increasing the number of north-south pole pairs on the rotor. For example, by increasing the number of core components from six to twelve for a given rotor structure that arcuate length can be lessened and the number of field winding turns required is diminished to give the designer more flexibility in achieving control over the height along the axis or profile of the motor. With the motor design of the invention, it further is desirable that the widthwise extent of that portion of pole components referred to as a winding support region be as wide as possible with respect to the arcuate length of the flux interaction surface. In this regard, the circumferential extent of the flux interaction surface should be no more than about 2.5 times the widthwise extent of the winding region of a core component.

With the design of the invention, advantage also is taken of the capability for pressure shaping the core components or stator assemblies, for example, utilizing net shaping procedures. In this regard, transitions effecting changes in levels between the induction region of a core component leading to the flux confronting face and that region supporting a winding are provided. These transitions appear as ramps leading to widened field winding support regions which function as coupling enhancers improving the coupling of the applied or electromagnetic flux field into the core component and also reduce the overall height of the motor over the windings along the axis.

FIG. 1 illustrates the immediately apparent design disadvantage occasioned by the low permeability design parameter as it is compared with a quality lamination material. In the figure, curves are shown which plot permeability with respect to induction in kilogauss (kG). Curve 10 is developed from a conventionally available laminar material identified as M-19FP having a 24 gauge thickness. The reader may now contrast the permeability characteristics of this conventional material with the corresponding permeability characteristics of processed ferromagnetic materials as are employed with the motors of the invention, as represented at curve 12. The material deriving curve 12 is identified as SM-2HB marketed by Mii Technologies, LLC of West Lebanon, NH. This material is described as having low eddy current losses as a percentage of hysteresis loss. For example, at 60 Hz, and an induction of 1.5 Tesla, the material exhibits 9% eddy current loss and 91% hysteresis loss. Thus, the material is capable of providing a significant advantage for electrically commutated motors that operate at frequencies higher than line frequencies. However, its permeability characteristics would, at first observation, render it unfit to meet the packaging and performance criteria sought in many applications.

The motor architecture of the invention is described in conjunction with a severe application of criteria associated with small but very high speed disc drive applications. In this regard, the motor illustrated was designed for a disc drive operating at 15,000 rpm and with a profile or height above the base or reference surface of the disc drive wherein the combination of rotor borne permanent magnet and an associated stator core assembly including field winding is slightly more than 3 mm and the noted radius from the center line to the functioning air gap, i.e., to the confronting surface of the permanent magnet components was about 17 mm. Further contemplated for this same architecture is a disc drive of essentially the same dimensional requirement performing at 40,000 rpm. For all of such high speed embodiments, the core switching frequencies typically will exceed 1000 Hz, representing values which are highly difficult to accommodate for with conventional laminar core structures, inasmuch as the core losses encountered become more severe at such elevated frequencies.

In the instant discussion, the parameter, "torque constant" may be represented by the following expression:

$$K_T = \frac{E_S}{N_{NL}} (K) \quad (1)$$

where;

$K_t$=Torque Constant: $E_s$=Motor Supply Voltage: $N_{NL}$= Ideal No-Load Speed, and K=A Conversion Constant. The term voltage constant ($K_E$) is the reciprocal of the torque constant when the torque constant is expressed in Newton Meters/A and the voltage constant is then expressed as volt-sec./radian.

The parameter "field winding resistance" means the d.c. resistance of the motor winding that is presented to the electrical driving circuit.

The term "functioning air gap radius" is intended to mean the radial length from the motor axis to the midpoint of the working air gap which is driven.

Figure 2:
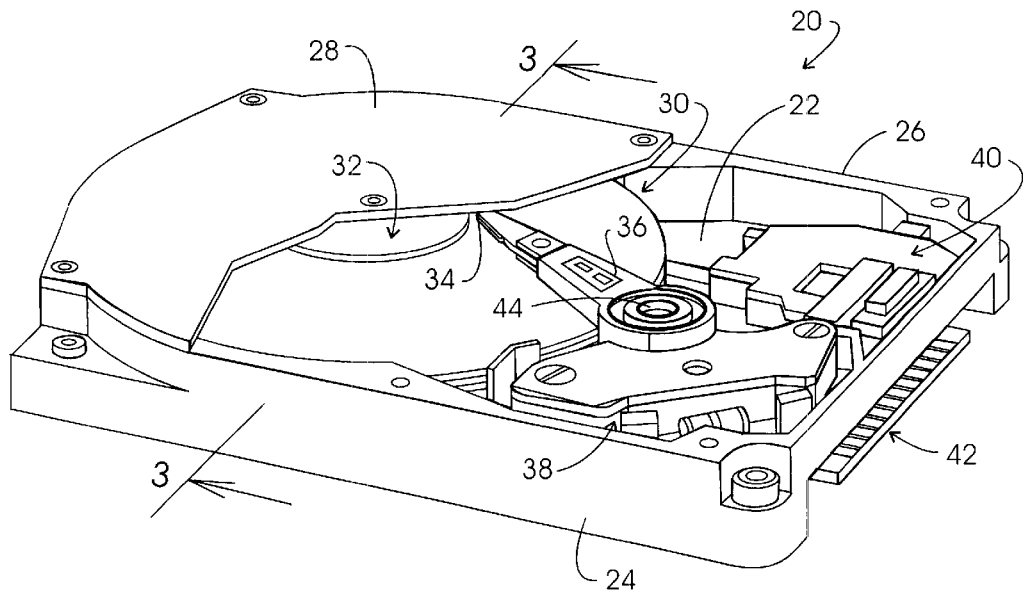
FIG. 2 is a perspective view of a disc drive with portions broken away to reveal internal structure.

Referring to FIG. 2, a rotating element magnetic storage device employing rigid storage media, generally referred to as a "disc drive" is shown in general at 20. Drive 20 is one exhibiting a highly compact size and which functions in conjunction with memory discs which are rotated at 15,000 rpm. The diminutive packaging features of the drive 20 impose severe envelope restraints upon the spindle motor which functions to carry out the high speed rotation of the rigid disc media, particularly in terms of its "profile". The latter term refers to the height of the motor above the base and associated reference surface 22 upon which the motor is mounted. Device 20 is seen to include side walls 24 and 26 extending from the base 22 and a removable upper cover 28. A sequence of rigid magnetic memory discs is shown in general at 30 which are retained over a motor spindle or hub by a spindle clamp represented generally at 32. Accessing the disc sequence 30 are multiple magnetic heads, one for each disc surface, each supported from an arm or suspension assembly the top arm of which is shown at 36. All the head suspension arms are in turn, rotated around a pivot 44 by an angular movement motor represented generally at 38, conventionally referred to as a head positioner motor. Peripheral support devices are represented generally at 40 supported from base 22 and a multilead connector is shown generally at 42.

Figure 3:
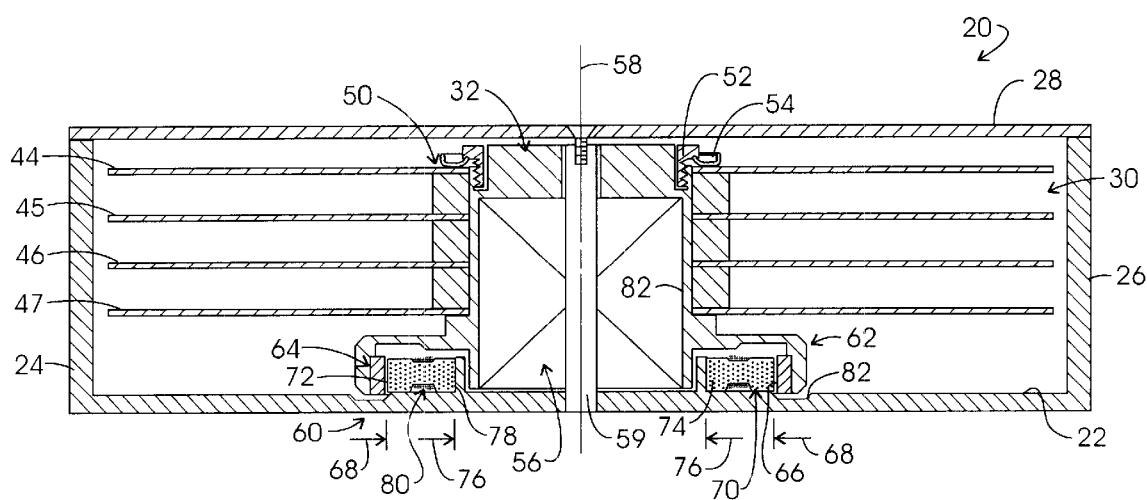
FIG. 3 is a sectional view taken through the plane 3—3 shown in FIG. 2.

FIG. 3 reveals that the sequence of discs 30 includes discs 44–47 which are mounted upon a spindle or hub represented generally at 50 and are retained in place by the spindle clamp 32. That clamp 32 is formed with an externally threaded collar 52 and a spring retainer 54 which engages the disc sequence 30. These discs, for example, will be about 0.031 inch thick and their mutual spacing is approximately 0.073 inch. To achieve the high rotational speeds called for, a low friction bearing system is required for the spindle 50. For example, an air bearing is represented in general at 56 which provides for rotation about a motor axis 58 at a stationary axle or spindle 59 fixed to base 22 and top cover 28. Such air bearings as at 56 ride on a thin film of gas which provides lubrication. In the case of aerodynamic or self-acting bearings, the air film or gas film is created by the relative motion of two mating surfaces separated by a small distance or clearance. From rest, as rotational speed is increased, a velocity induced pressure gradient is formed across the clearance. The increased pressure between the surfaces creates the load carrying effect of the mechanism. Such bearings are marketed, for example, by Specialty Components, Inc. of Wallingford, Conn. Self-acting gas bearings also are described in the publication, "BEARINGS" edited by M. J. Neale, published by the Society of Automotive Engineers, Inc. of Warrendale, Pa.

The high speed d.c. PM motor which drives the disc sequence 30 about this air bearing 56 is represented generally at 60. Motor 60 is called upon to achieve the noted high speeds while maintaining a very low profile. That profile is measured from its bottom which abuts against the reference plane at base 22 to the top of the uppermost field winding wire and will, for example, be about 4 mm. For the stator shown in FIG. 8 or 3.4 mm for the stator shown in FIG. 6. The rotor of motor 60 is shown generally at 62 representing a portion of hub 82. Rotor 62 is rotationally supported by the air bearing 56 and carries an arcuate permanent magnet assembly represented generally at 64 which is configured having a sequence of eight generally arcuate regions of alternating magnetic polarity. Those magnet regions present a confronting magnetic surface 66 facing inwardly toward the axis 58 of the motor. Motor 60, in order to achieve the high speed called for, must exhibit a predetermined relatively low torque constant. Because of the low torque constant a relatively high starting current will be required in order to accelerate the disks rapidly enough to get head lift off in the required time. To maximize space for the disks the motor is required to have a very low profile because the interior of the hub 82 is occupied by the air bearing system so the motor must fit below the disks. The motor must therefore be short radially as well as axially. Shown in FIG. 3 the motor air gap radius is ½ of the diametric extent of the magnetic surface 66. The latter dimension is represented by arrow pair 68. For the instant motor embodiment that diametric extent is 34.85 mm. Located inwardly from the magnet assembly 64 and supported upon the reference plane or non-conductive base 22 is an annular stator core assembly represented generally at 70. Formed of the above-discussed processed ferromagnetic particles using pressed powdered metal technology, the multiple core components of the assembly 70 extend from a flux interaction surface 72 spaced from the confronting magnetic surface 66, to define the functioning air gap of motor 60, to a back iron assembly represented generally at 74. Because of the air bearing requirements, the back iron assembly 74 is radially or diametrically restricted in an inward sense to a diameter of 22.3 mm as represented by the arrow pair 76. The stator core assembly 70 is seen to be positioned and supported at this back iron assembly region 74 by an annular collar 78 formed with the base 22.

Each of the core components of the stator core assembly 70 includes a winding support region, each of which, in turn, supports and is in flux transfer communication with the winding components of a field winding assembly represented generally at 80. This field winding assembly will exhibit a predetermined field winding resistance that is low enough to permit the aforementioned starting current and represents a third parameter involved in achieving a design flexibility including the low profile, as well as the high speed characteristic of the motor 60. In general, the profile or height of the motor 60 is predicated upon the uppermost height of these windings with respect to the reference surface or base 22. In this regard, the stator core assembly 70 is seen to rest in flat abutting relationship against that reference surface 22. Because the magnet assembly 64 extends slightly below the plane of that surface 22, a shallow annular groove 82 is formed therein.

Figure 4:
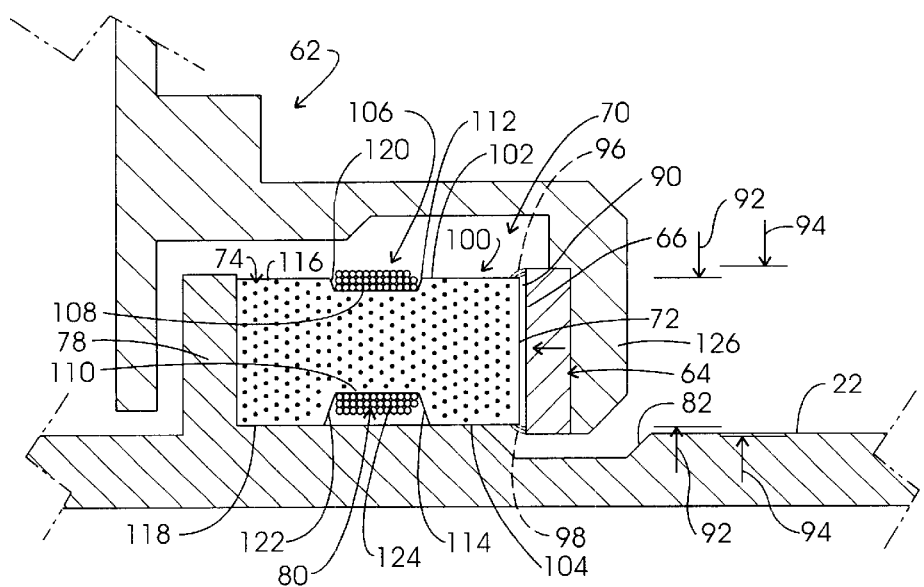
FIG. 4 is a partial sectional view of a rotor and stator core component described in connection with FIG. 3.
Figure 5:
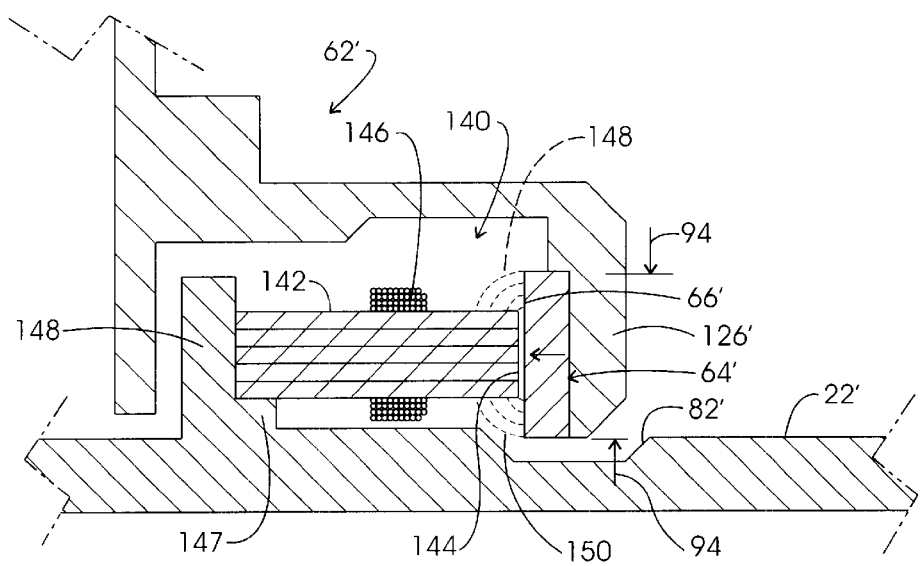
FIG. 5 is a partial sectional view of a laminar stator core structured implementation of the motor FIG. 4.

Referring to FIG. 4, an enlarged representation of a core component of the stator core assembly and its association with the rotor carried permanent magnet is revealed. FIG. 4 illustrates the rightward section of the rotor and stator assembly as shown in FIG. 3 in enlarged fashion. In the figure, the flux interaction surface 72 of the stator core assembly 70 again is seen to be spaced from the corresponding confronting magnetic surface 66 of permanent magnet 64 to define a functional or working air gap 90. The flux interaction surface 72 of the stator core assembly core component will have a principal dimension or face height represented by paired arrows 92. For the embodiment described, that height or principal dimension became 3 mm. That dimension is slightly less than the corresponding principal dimension or height of the permanent magnet 64 which additionally is shown in FIG. 5 by paired arrows 94. The latter height or principal dimension is 3.4 mm for the instant embodiment. Note the symmetrical alignment of the confronting faces or surfaces 66 and flux interaction surface 72. Thus there is permitted a slight overlap of flux transfer from the permanent magnet 64, as represented by the dashed flux representation lines 96 and 98. Located immediately inwardly from the surface 72 is an induction region represented in general at 100. Induction region 100 extends in flux transfer relationship from the flux interaction surface 72 inwardly and is formed between mutually parallel oppositely disposed surfaces 102 and 104 which are spaced apart the same principal dimension or height as the flux interaction surface 72. In this regard, note that the flat surface 104 is shown supported adjacent the reference plane 22 of the motor and that the vertical principal dimensions involved are in parallel relationship with the axis 58 of motor 60.

Located next inwardly from the induction region 100 is a winding support region represented generally at 106. Support region 106 is seen to be formed with oppositely disposed mutually parallel surfaces 108 and 110. Note that surface 108 is in parallel relationship with induction region surface 100, while support surface 110 is similarly arranged in parallel relationship with induction region surface 104. Support surfaces 108 and 110 are spaced apart a principal dimension taken parallel with motor axis 58 which is seen to be less than the corresponding principal dimension spacing apart induction region surfaces 102 and 104. This lessened dimension creates what appears as a double sided notch structure at the winding support region 106. However, region 106 will be seen to be quite wide in consonance with the above-discussed ratios. The planar surface 108 is established by a ramp-shaped forward coupling transition 112 slopping downwardly and inwardly from the edge of surface 102 to corresponding edge of surface 108. Another ramp-shaped forward coupling transition is shown at 114 extending inwardly and upwardly from the edge of surface 104 to the corresponding edge of surface 110. Transitions 112 and 114 serve, inter alia, to define the level of respective surfaces 108 and 110 and further function in the improvement of flux transfer or coupling the applied field between the winding components of the field winding assembly 80 and adjacent induction region 100. Note that the amount of transition between surfaces 102 and 108 is less than that between surfaces 104 and 110. In the embodiment shown, the level change to surface 108 is 0.25 mm, while the level change between surfaces 104 and 110 is 0.65 mm.

The mutually parallel winding support region surfaces 108 and 110 extend inwardly to the back iron assembly 74 which, for the present embodiment, is formed with upper and lower mutually parallel back iron surfaces 116 and 118. A ramp-shaped rearward coupling transition 120 extends between the winding support surface 108 and back iron surface 116. In similar fashion, a ramp-shaped rearward coupling transition 122 extends between the winding support surface 110 and back iron surface 118. Transitions 112, 114, 120 and 122 function to establish oppositely disposed wide valleys for the winding support region 106 and, thus, function to lower the overall winding height. It will be seen that the winding support regions are expanded in the opposite or widthwise dimension to accommodate for magnetic flux transfer without core saturation. As in the case of transitions 112 and 114, transitions 120 and 122 also function to improve flux transfer or coupling between an associated, i.e., supported, winding component and the processed ferromagnetic particle core structure. Note that lower induction surface 104 and lower back iron surface 118 are coplanar and are supported at the reference plane of base 22. Transitions 114 and 122 are so dimensioned as to provide a surface 110 level adjustment wherein all of the windings are retained interiorally, i.e., above the base 22 reference surface. At the opposite surface, however, the windings can build slightly above coplanar surfaces 102 and 116 due to the necessary clearance provided by the hub defining structuring of rotor 62. The winding component for the instant core component is represented in the figure schematically at 124 and for a twelve pole embodiment, will be provided with 19 turns of 0.16 mm wire. This embodiment gives the lowest overall height of the stator assembly over the wire of 3.4 mm, a highly desirable feature for this application.

Permanent magnet assembly 64 may be formed, for example, of a neodymium magnetic material. Its size, while important to the performance of the motor, is selected from the standpoint of a criteria of maintenance of a compact or miniaturized shape or envelope as well as by important considerations of cost. The assembly 64 performs in conjunction with a back iron function provided by the portion or region 126 of the hub or spindle defining rotor 62. That component 62 with region 126 typically is formed of a machined magnetically responsive stainless steel. For all embodiments of the magnet assembly 64, an eight-pole rotor is utilized. In this regard, each such rotor will have a sequence of eight generally arcuate regions of predetermined and alternating magnetization.

Because of the noted cost and sizing constraints, the selection of a magnet assembly as at 64 typically will result in the same magnet structure and formulation, whether laminar or processed ferromagnetic particle stator core structures are employed. FIG. 5 reproduces the principal components of the motor 60 but with a sizing geometry and proportioning which would be employed utilizing conventional laminar steel core material. Thus, where the eddy current losses under high speed switching are dismissed for purposes of comparison, the size proportioning of components of FIG. 5 can be contrasted with the above-described components of FIG. 4. In the former figure, where the components generally are the same, they are identified with the same numeration utilized in FIGS. 3 and 4 but in primed fashion. In FIG. 5, a stator core assembly is represented in general at 140. Assembly 140 is formed with a stack 142 of laminar magnetically responsive sheets. These sheets extend to a flux interaction surface 144 positioned in adjacency with the confronting magnetic surface 66' of magnet assembly 64'. Because of the more desirable permeability characteristics of the core stack 142, its profile or height is lessened as compared to that of assembly 70 and the extent of field winding components required for each core component 142, as shown at 146, is slightly increased with respect to the 12 pole embodiment of the pressed powdered metal stator shown in FIG. 4. The addition of a sixth lamination to core stack shown at 142 would reduce the required turns 146 but the overall height of stator assembly over the wire would probably suffer as well as creating a cost increase and potentially adversely affecting the copper iron ratio. For the laminated stator assembly shown in FIG. 5, the number of turns provided is 39 with a gauge of 0.16 mm. The resulting overall stator height is 4.1 mm. This compares to the 6 pole pressed powdered metal stator requirement of 35 turns of 0.16 mm wire and an overall stator height of 4.1 mm. The laminated stator assembly of FIG. 5 achieves a physical winding height such that the stack 142 can be mounted over a step 147 formed within an inner collar 148. As in the embodiment of FIG. 4, a flux overlap between the confronting surface 66' and the core stack 142 is provided, as represented at dashed flux line representations 148 and 150.

A comparison of FIGS. 4 and 5 reveals that by a configuration of the induction region 100 and its flux interaction surface 72 with their principal dimension 92, the highly restricted packaging envelope for the motor can be maintained along with the necessary torque constant. Because of the realized increase in induction coupling from the permanent magnet assembly 64 provided by this feature, and by adherence to the noted ratio requirement, the number of windings required, for example, at winding of assembly 80 in the embodiment of FIG. 4, can actually be slightly reduced when comparing 6 pole configurations. This is achieved without a stator overall height penalty and is based upon the disparities of permeability between the two stator core structures. With this achievement, requisite rotational and core switching speeds can be realized with the embodiment in FIG. 4 without an attendant severe increase in eddy current losses and with a reduction in the cost of the motor. As noted earlier, the 12 pole stator configuration shown in plain view in FIG. 6, yields a significant reduction in winding turns 80 and a significant reduction in overall stator height from 4.1 mm to 3.4 mm.

Two implementations of the stator core assembly 70 of motor 60 are illustrated in connection with FIGS. 6 through 9. FIGS. 6 and 7 reveal a twelve stator core component or twelve pole embodiment of the assembly 70 and a configuration wherein the entire stator assembly is integrally formed using pressed powdered metal technology. An important aspect of these structures including the design of the induction region, winding support region and back iron assemblies is a criterion that the structure presents or has a cross sectional area attribute which is effective to convey the path of magnetic flux confronting that cross section, understanding that a variety of flux paths will occur. Further, the ratio of the arcuate or circumferential length of the flux interaction surface to the width of the winding support region should not exceed about 2.5. Maintaining this ratio yields optimum results when implementing pressed powdered metal in electric motor applications where performance, space and cost are at a premium. The twelve pole implementation shown in the figure is a desirable architecture from the standpoint of that ratio criteria. An aspect of the instant design resides in a recognition that the flux path directions are primarily two-dimensional in nature in that the flux paths, for instance, remain in the plane of the paper carrying the figures at hand. No principal flux paths deviate from that plane or aspect other than the compression that occurs in the winding region 166. The twelve pole implementation of the assembly 70 is shown in FIG. 6 as having twelve spaced apart core components 160a–160l, each incorporating a respective induction region 162a–162l. These induction regions extend to and support respective flux interaction surfaces 164a–164l. Formed integrally with and extending inwardly from the induction regions 162a–162l are the earlier-described winding support regions identified respectively at 166a–166l. The back iron region remains identified in general at 74. As noted, each of these regions is configured such that it will exhibit the above cross-sectional area attribute which is effective for the non-saturation conveyance of confronting magnetic flux both from the coil winding as well as the magnet.

Because of the earlier-described performance characteristics of the processed ferromagnetic particle structuring, there is an enlargement of the flux interaction surface area and the provision of an induction region which confronts flux from the permanent magnets, i.e. an adjustment of the induction characteristic. This alteration is manifested by the above comparison made with equivalent laminar or stacked cores as discussed in general in connection with FIG. 5.

To gain some insight as to how the above confronting cross sectional area attributes are considered, a partial schematic representation of the permanent magnet assembly 64 and its associated permanent magnet back iron 126 is presented in FIG. 6. That presentation is made in conjunction with a tracing of certain of the flux path directions which will be encountered in the operation of motor 60. Effective presentation of this cross sectional area attribute is one which avoids any core saturation phenomena over the desired operating range of the motor. In the figure, the boundary between adjacent polar designated regions of the permanent magnet 64 are represented, for example, by the boundary lines 170–172. Arbitrary polar designations north (N) and south (S) are labeled within certain of these sections, as well as at locations upon stator core assembly 70. With this representative arrangement it may be observed that one path is represented by flux path arrows 176 and 177 extending from a north segment of permanent magnet 64 into the flux interaction surface 164c and induction region 162c of a core component 160c which is excited from an associated winding to evoke a north designated induction region. Path arrow 177 shows the flux path being satisfied by return to the next adjacent permanent magnet segment having a south (S) polar designation. This describes one of the permanent magnet flux paths. Another flux path due to the excited winding on core component 160c is from one induction region to a next adjacent one as represented by the flux path arrows 178 and 179 extending from core components 160c to components 160b and 160d. Primary field excitation of core component 160c will develop a flux path as shown at arrow 180. Additional field winding flux passes through magnet 64 to back iron region 126 and returns back through the magnet to oppositely polarized stator poles. A flux path also is represented at arrows 181 coursing about the permanent magnet back iron 126 for purposes of magnet flux circuit satisfaction. Where the stator core components are not excited, flux from the rotor carried permanent magnets, may follow paths such as represented by the flux entry arrow 182 and exit arrows 183 and 184. The cross sectional area confronting such flux paths must be of adequate extent, i.e., representing a cross sectional attribute which is effective to pass these flux paths without saturation. PPM materials generally have a lower saturation level than steel laminations, requiring commensurately larger cross sectional areas to avoid saturation. Where a diminution in cross section is provided as illustrated in connection with FIG. 7 at winding support regions 166j and 166d, then the widthwise aspect of those regions is increased well over what it would be, for example, in conjunction with a laminar core system. This is represented, for example, by a plane passing perpendicularly to a radius intersecting a given core component. Such a radius is represented in the figure at 190 and the cross sectional attribute showing such expansion is represented at arrow pair 192. That width or widthwise extent represented by arrow pair 192 preferably is as wide as possible and forms the denominator of the above-noted maximum ratio criteria. In this regard, the arcuate length or circumferential length of the flux interaction surfaces 164 are represented by the arc-shaped arrow 194. Recall that the ratio of that circumferential or arc value to the widthwise extent of flux interaction region represented at arrow pair 192 should not exceed about 2.5. It may be further observed that the type of motors described herein generally are referred to as "radial". In this regard, flux passage between the permanent magnet and the flux interaction surfaces 164 is generally in the direction of a radius from the motor axis 58 as represented at 190. For the embodiment of the FIGS. 6 and 7, the noted ratio is about 1.6.

FIGS. 8 and 9 illustrate a six core component implementation of stator core assembly 70. The discrete core components of this assembly 70 shown in FIG. 8 are identified in general at 200a–200f. Each of the latter components is formed with an induction region shown respectively at 202a–202f which, in turn, extends and is integrally formed with a respective winding support region 204a–204f. The latter regions, in turn, are integrally formed with the back iron region, again identified at 74. Note that the core components 200a–200f exhibit much wider flux interaction surfaces, shown respectively at 206a–206f, to gain adequate induction coupling from the permanent magnet flux and, additionally, wider winding support regions 204a–204f to avoid core saturation, for example, as represented by the arrow pair 208. This width may be contrasted in a manner similar to that set forth in the discussion concerning FIGS. 4 and 5 by indicating a corresponding width of a higher permeability stator core stack which is represented by spaced apart dashed lines 210. As before, a criterion for all components including the induction regions, winding support regions and back iron regions is that any given flux path region must have cross-sectional attributes which are effective for conveyance of confronting magnetic flux without saturation. That criterion is further evidenced by the principal dimension parallel to motor axis 58 of region 74, which is commensurate with, here equal to, the corresponding dimension of the induction regions as at 162a–162l (FIGS. 6 and 7) and 202a–202f (FIGS. 8, 9). The width represented by arrow pair 208 of the winding support region 204a–204f again is selected in conjunction with the arcuate length of the flux interaction surfaces 206a–206f to meet the maximum ratio criterion of 2.5. That latter arcuate length is represented by the curved arrow 212 in FIG. 8. For the six pole embodiment shown when utilized in the motor discussed above, the ratio becomes about 1.9. It should be noted in connection with FIGS. 6 through 9 that the earlier-discussed forward and rearward coupling transitions as discussed in connection with FIG. 4 are retained for the same purposes of improving the coupling of the applied field and confining the winding components associated with the winding association region generally within the mandated planar top and bottom envelope of the stator assemblies. Additionally, FIGS. 7 and 9 reveal that the same variation in winding support surface level is achieved with these coupling transitions FIGS. 10 and 11 reveal an embodiment which corresponds with that of FIGS. 8 and 9 but without the noted internal diametric restraint. FIG. 10 shows a stator core assembly represented generally at 220 which is somewhat similar to that described in connection with FIGS. 8 and 9 in that it is of a six core component architecture. In this regard, the six core components are represented in general at 222a–222f. Each of these core components 222a–222f extends from an outwardly disposed flux interaction surface shown respectively at 224a–224f which, in turn, are integrally formed with and extend inwardly into respective induction regions 226a–226f. Integrally formed with and extending inwardly from those induction regions are respective winding support regions 228a–228f. Formed with those winding support regions 228a–228f is the annular shaped back iron assembly or region represented generally at 230 and which is seen to extend to an inwardly disposed annular boundary 231. Looking to FIG. 11, it may be seen that induction region 226e is configured with oppositely disposed mutually parallel induction surfaces 232e and 234e and, in similar fashion, induction region 226b is configured with corresponding surfaces 232b and 234b. In similar fashion, the winding support regions 228a–228f are configured with spaced apart mutually parallel winding support surfaces otherwise generally identified with numbers 236 and 238 as are revealed in FIG. 11 at 236e and 238e as well as at 236b and 238b. As in the earlier embodiments, the structuring represented in the instant figures is one meeting the noted maximum ratio criterion. That is, the arcuate or circumferential length of the flux interaction surfaces 224a–224f when compared to the width of the winding support regions 228a–228f does not exceed a value of about 2.5.

As in the earlier embodiments, forward coupling transitions are provided as at 240a–240f otherwise identified generally with the number 242. These are seen in FIG. 11 at 240e and 242e as well as at 240b and 242b. However, no rearward coupling transitions are provided and the winding support surfaces 236a–236f otherwise identified generally by the number 238 (see 238e and 238b in FIG. 11) simply extend rearwardly to assume the function of the back iron assembly represented generally at 230 and extending to the inward boundary 231. The forward coupling transitions 240 and 242 establish the same relative levels for the winding support surfaces in the same manner described above in connection with the earlier embodiments. Note, however, that the stator core assembly 220 may be supported at a reference plane or base by the six induction region lower surfaces identified generally with the number 234 and shown at 234e and 234b in FIG. 11.

As is apparent, a design flexibility is present with respect to the configuration of the back iron assembly. For example the principal dimension of that assembly taken parallel with the motor axis may be enlarged to a value greater than the corresponding dimension of the induction region while its radial dimension is shortened. This flexibility may aid a given packaging requirement and takes advantage of the noted net shaping characteristic of the pressed processed ferromagnetic particulate materials.

Figure 12:
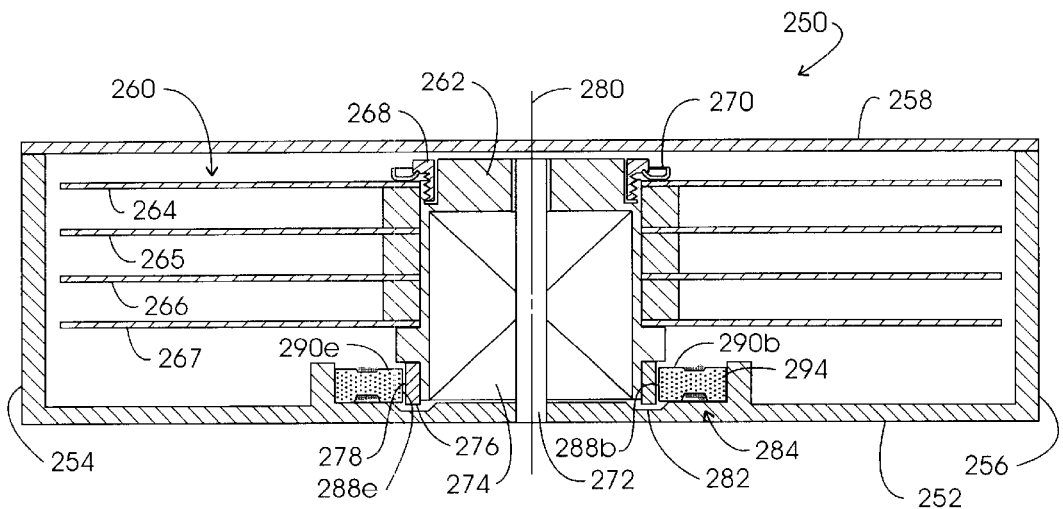
FIG. 12 is a sectional view of another embodiment of a motor according to the invention showing its implementation with a disc drive.
Figure 13:
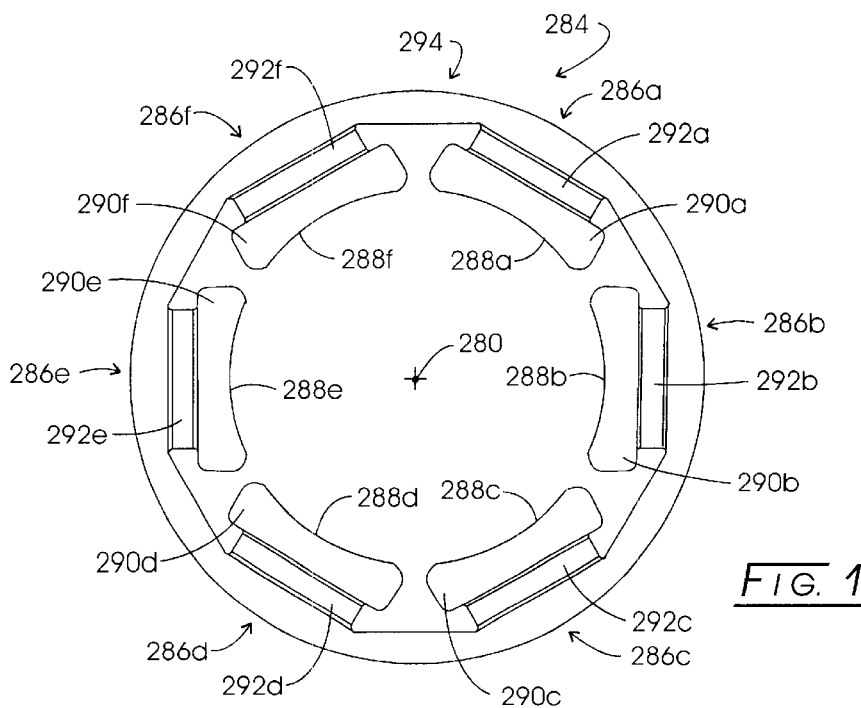
FIG. 13 is a top view of the stator core assembly employed with the motor shown in FIG. 12.

The design flexibility of the instant motors is demonstrated in connection with FIGS. 12 and 13. In those figures, an embodiment is presented wherein the functioning or working gap between the rotor borne permanent magnet and the stator core assembly is disposed inwardly radially from the base of that latter assembly. While a performance penalty is paid by virtue of the lower radius values to the working gap, the motor can be designed to meet a compactness envelope. To illustrate the similarity of structuring, the motor of FIGS. 12 and 13 is shown associated with a disc drive application resembling that discussed earlier in connection with FIG. 3. In FIG. 12 the disc drive is represented generally at 250. As before, the drive 250 includes a nonconductive base 252 with associated upwardly disposed reference surface from which integrally formed side walls 254 and 256 extend upwardly for attachment to an upperly disposed cover 258. The disc drive 250 functions to rotate and access a sequence of memory discs represented generally at 260 which are mounted upon a hub or spindle represented generally at 262. Four discs, of the sequence 260, identified at 264–267 are mounted for rotation on the hub 262 in conjunction with three ring-shaped spacers and the sequence 260 is retained in position by a clamp including externally threaded collar 268 performing in conjunction with a spring retainer 270. The hub 262 and disc sequence 260 rotate about a stationary axle 272 and are supported therefrom by an air bearing or similar low friction rotational mount as represented in general at 274. Hub or spindle 262 functions as a PM rotor, providing back iron for and supporting a ring shaped permanent magnet assembly 276 which is formed having a sequence of generally arcuate regions of predetermined and alternating magnetization. Each of those regions presents a confronting magnetic surface 278 of arcuate shape at a radius spaced from a centrally disposed motor axis 280, forming an air gap radius. Magnet 276 extends slightly below the reference surface of base 252 and to accommodate for this slight extension, an annular groove 282 is formed within that base.

The hub defining rotor 262 is surrounded by a stator core assembly represented generally at 284 which is configured having spaced core components formed of pressure shaped processed ferromagnetic particles which are generally mutually insulatively associated. Looking additionally to FIG. 13, this assembly 284 is revealed having a six core component configuration, those components being represented generally at 286a–286f. Each core component 286a–286f presents a flux interaction surfaces shown respectively at 288a–288f toward the motor axis 280 to define the noted functional gap of the motor with the permanent magnet confronting magnetic surface 278. As before, these flux interaction surfaces have a surface area including a principal dimension in parallel relationship with the motor axis 280 to provide a magnetic field coupling induction with the selected permanent magnet which acts in conjunction with the energized field generated by the appropriate field winding turns to provide the predetermined torque constant. That vertical dimension and area requirement is repeated in conjunction with the immediately adjacent induction regions shown respectively at 290a–290f.

As in the earlier embodiment, the induction regions 290a–290f are formed with parallel flat upper and lower surfaces with a principal dimension parallel to the motor axis 280. The functioning air gap established by them with the permanent magnet is created such that the permanent magnet slightly overlaps these two parallel surfaces. Next radially outwardly in the core component structure are winding support regions shown respectively at 292a–292f each being formed having upper and lower support surfaces which, as in the earlier embodiments described in connection with FIGS. 4, 7 and 9, are configured with forward coupling and rearward coupling transitions to provide upper surface and lower surface defined notch-like configurations functioning to control total field winding height, as well as to enhance magnetic coupling between the field winding component and the core component. As described in FIG. 8, the "circumferential" width or width taken normally to the centrally disposed radius extending from motor axis 280 is enhanced within the winding support region to exhibit cross-sectional area attributes which when confronting flux path activity, will avoid core saturation. The enhanced widthwise dimensioning, however, permits a control over the vertical dimension or profile of the stator assembly. As in the early embodiments the width dimension at the winding support regions 292a–292f when compared with the arcuate or circumferential length of the flux interaction surfaces 288a–288f continues to meet the noted ratio criterion. In this regard, the latter arcuate length divided by the width of the winding support region should not exceed a value of about 2.5.

Integrally formed with the winding support regions 292a–292f is the annular-shaped back iron assembly represented generally at 294. FIG. 12 reveals that this assembly 294 is configured with a height or principal dimension commensurate with or equal to the height of the induction regions 290a–290f. This is to provide improved coupling from the winding and a cross-sectional area attribute effective for magnetic flux conveyance without encountering saturation.

While the winding excitation approaches for operating brushless motors such as those described herein vary somewhat, the windings typically are interconnected in either a "Y" or a "Delta" configuration for three phase operation Description of such excitation circuits is provided in the above-referenced United States patents including, for example, U.S. Pat. No. 5,874,796 incorporated herein by reference.

Current analysis of the processed ferromagnetic particles which are used in providing the stator core assemblies of the motors of the invention from a microscopic standpoint, looks at them as the surface of each particle providing a path for eddy current flow which is relatively insulated from adjacent particles. Such a flow aspect can be contrasted with the eddy current activity in a laminar core structure. In such laminar core structures, the eddy currents, being surface phenomena, reside at the surfaces of each of the laminar sheets of the core. In another approach to considering the processed ferromagnetic particle stator core structures, they are considered from a macroscopic standpoint wherein the entire structure is treated somewhat as an insulator. These aspects of this material lead to a desirable constructional feature of the stator core assemblies employed with the motors of the invention. In this regard, the back iron assemblies can be fabricated as a compilation of discrete components which are abuttably joined together. Such juncture-based formation is done with compression, inasmuch as it is the property of the materials at hand that they are structurally sound under compression but structurally weaker in tension. In general, such multi-component back iron structuring for stator core assembly is not available with conventional laminar structures due to the disposition of flux coupling between adjacent structures and eddy currents within them. However, with the instant motors, a substantial manufacturing advantage accrues. In this regard, the winding support regions can retain field winding components which have been wound about insulated bobbins. Those bobbins then can be inserted into position from the back iron region onto the winding support region prior to its interlocking assembly with the core component portions.

Figure 14:
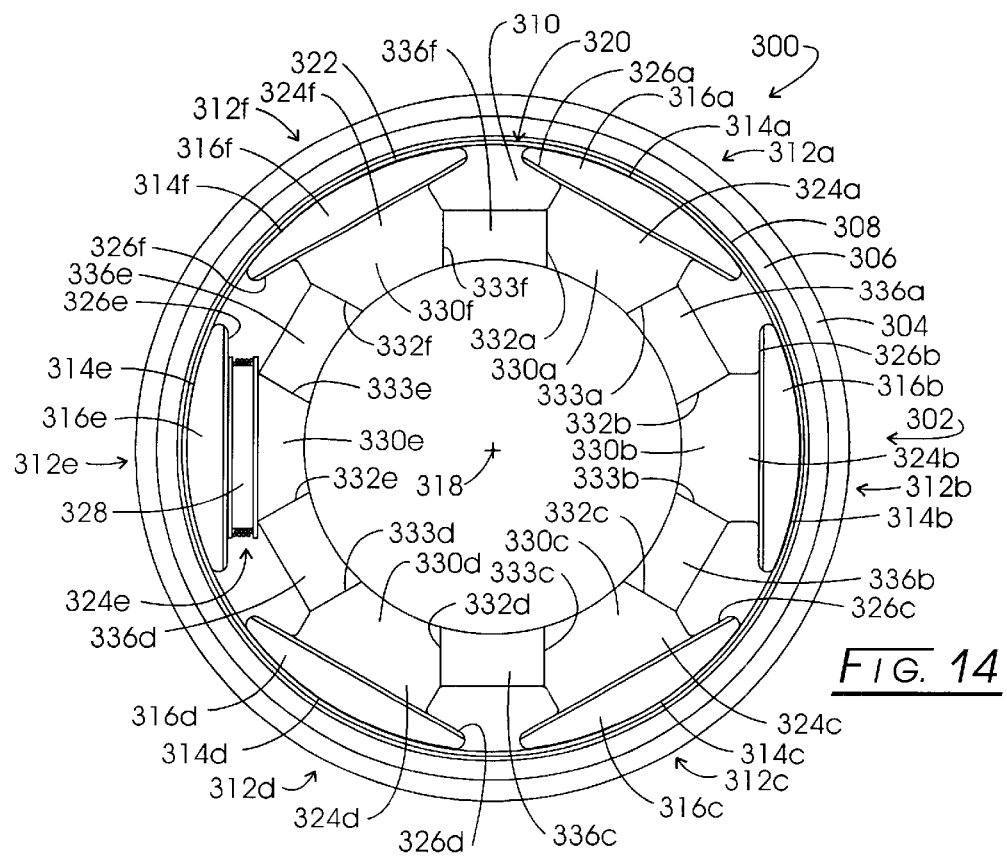
FIG. 14 is a top view of a stator core assembly and associated rotor utilizing interkeyed discrete processed ferromagnetic particle structures.

Referring to FIG. 14, a stator assembly and rotor combination incorporating one version of this interlocking back iron assembly feature is represented generally at 300. Assembly 300 emulates the six core component structure of FIGS. 10 and 11 wherein the back iron assembly exhibits a principal dimension parallel with the motor axis which corresponds with the principal dimension of the winding support region. The rotor component of assembly 300 is represented generally at 302 and includes the PM magnet back iron component schematically represented as an annulus 304 which supports or carries a PM magnet 306 formed as a sequence of generally arcuate regions of alternating predetermined magnetization. The inwardly disposed face exposing these magnetic regions provides an arcuate confronting magnetic surface 308 serving as one side of a functioning or working air gap.

A stator core assembly is represented in general at 310 and is seen to comprise six spaced core components represented generally at 312a–312f. As in the embodiment of FIGS. 10 and 11, core components 312a–312f are formed with respective flux interaction surfaces 314a–314f representing the forward face of corresponding respective induction regions 316a–316f. As in the earlier embodiments, the principal dimension of the flux interaction surfaces taken parallel to the motor axis 318, as well as the corresponding principal dimension of induction regions 316a–316f provides a flux interaction surface located in spaced adjacency with the rotor confronting magnetic surface 308 to define a functioning air gap 320. However, as part of that air gap 320 there is provided a tensioning assembly 322, here implemented as a tension ring formed of non-magnetically responsive material such as a polymeric material or aluminum.

Returning to the core components 312a–312f, formed integrally with the induction regions 316a–316f are respective winding support regions 324a–324f, support region 324e being referred to in general fashion. Configured in consonance with the cross section illustrated in FIG. 11, the winding support regions 324a–324f are formed having parallel, oppositely disposed surfaces spaced apart and a principal dimension parallel with the motor axis 318 which is less than the corresponding principal dimension of the induction region associated therewith and described at 316a–316f. The upper and forward coupling transition for core components 312a–312f are shown in FIG. 14 respectively at 326a–326f. With this arrangement, the parallel, spaced apart upper and lower surfaces of both the winding support region and the associated back iron assemblies have a coplanar relationship particularly suited for inserting an insulated bobbin pre-wound with a field winding component over the field winding support region by placement from the back iron assembly region. Such a bobbin and winding assembly is shown positioned over winding support region 324e at 328. As is apparent, each of the winding support regions 324a–324f, depending upon the design involved, will receive one such winding component and bobbin assembly.

To provide for this winding component insertion or mounting arrangement, a back iron extension region as represented at 330a–330f is formed integrally with each respective winding support region 324a–324f. Each back iron extension region 330a–330f is configured with two, spaced apart back iron abutting surfaces 332a, 333a–332f, 333f. Note that with this geometrical structuring the back iron abutting surfaces 332a, 333a–332f, 333f provide a keystone form of structural configuration. This permits an inter-keyed abutting relationship with six discrete back iron linking members 336a–336f. Each of those back iron linking members 336a–336f is formed having two, spaced apart back iron abutting surfaces which are co-identified with the back iron abutting surfaces of the back iron extension regions 330a–330f at 332a, 333a–332f,333f. Due to the compressive structural action asserted from the tensioning assembly 322, a close and intimate abutment providing the noted inter-keyed abutting relationship is achieved at each of these abutting unions identified at 332a, 333a–332f, 333f. Because of the above-noted nature of the processed ferromagnetic particle configuration, electromagnetically generated and permanent magnet generated flux readily is transferable along the back iron assembly and the advantage of an enhanced assembly procedure for providing winding components is made available.

Another advantage realized in connection with the assembly of the discrete core components with correspondingly discrete back iron linking members stems from a determination that these components can be adhesively connected together while retaining requisite flux transfer characteristics. Preferably, this adhesive-implemented assembly is combined with the noted tensioning assembly to provide a compressive-adhesive combination. A suitable adhesive has been found to be, for example, #4210, marketed by Loctite of Newington, Conn.

Figure 15:
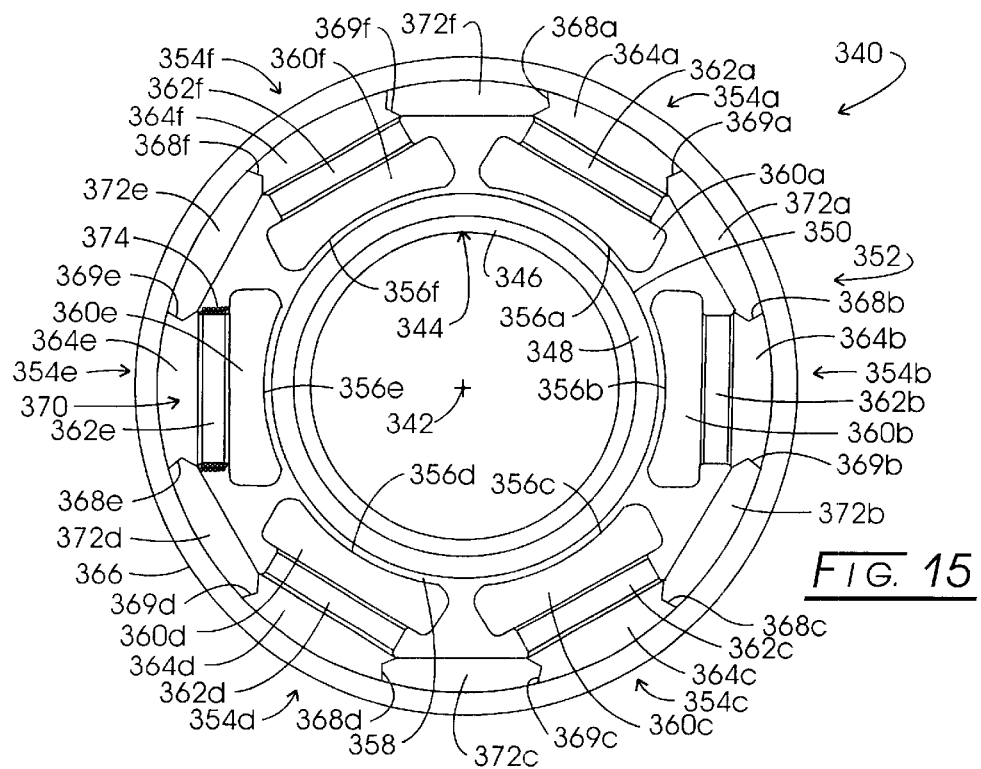
FIG. 15 is a top view of another embodiment for a stator core structure and rotor assembly utilizing interkeyed processed ferromagnetic particle components.

In addition to the keystone structuring shown in the instant figure, interlocking geometrys at the back iron abutting surfaces can be employed. One such arrangement is presented in connection with the assembly 340 shown in FIG. 15. Assembly 340 emulates the structure discussed above in connection with FIGS. 12 and 13 in that the flux interaction surfaces of the core components of the stator core assembly face inwardly toward the motor axis shown at 342. The rotor of assembly 340 is represented generally at 344 and is seen to include a PM back iron component schematically represented as an annulus at 346. Component 346 supports an annular magnet material 348 which is provided with a sequence of generally arcuate regions of predetermined magnetization alternating between north and south polarities and which presents a confronting magnetic surface 350 of principal dimension in parallel with the motor axis 342. Extending around this confronting magnetic surface 350 is a stator core assembly represented generally at 352.

Assembly 352 is configured with six spaced apart core components formed as the noted pressure shaped processed ferromagnetic particles and represented generally at 354a–354f. Similar to stator assembly 284, the stator assembly 352 of the core components 354a–354f each are configured with a flux interaction surface shown respectively at 356a–356f. Surfaces 356a–356f combine with the confronting magnetic surface 350 to define a functioning or working air gap 358. As before, the functioning air gap radius extends from the motor axis 342 to the surface 350. Extending radially outwardly from the flux interaction surfaces 356a–356f are respective induction regions 360a–360f. As before the flux interaction surfaces 356a–356f, as well as the associated induction regions 360a–360f, will exhibit a principal dimension parallel with motor axis 342 and a corresponding surface area selected to provide the magnetic field coupling induction with the selected permanent magnet which acts in conjunction with the energized field generated by the appropriate field winding turns to provide the predetermined torque constant.

Formed integrally with the induction regions 360a–360f are respective winding support regions 362a–362f. Support regions 362a–362f are configured in the manner described in connection with FIGS. 12 and 13, having mutually parallel upper and lower winding support surfaces, the levels of which are defined by forward and rearward coupling transitions to evolve the radial cross section shown in FIG. 12. As before, the diminished principal dimension in parallel with the motor axis 342 of the winding support regions 362a–362f is accommodated for in terms of the cross-sectional area confronting magnetic flux paths by expanding the widthwise dimension of this region, i.e., the width extending perpendicularly to a radius through the center of the core component. The rearward coupling transitions then also provide for re-establishing a larger principal dimension parallel to the motor axis 342 at the integrally formed back iron extension regions shown respectively at 364a–364f. These regions 364a–364f exhibit a principal dimension in parallel with motor axis 342 which corresponds with the principal dimension of the flux interaction surfaces 356a–356f such that the overall diameter of the assembly 340 may be controlled by the designer. Note at this juncture, that each of the core components 354a–354f may be treated as a discrete member for purposes of providing winding components about their winding support regions 362a–362f. This flexibility in assembly, permitting a much more facile winding procedure is beneficial.

Each of the back iron extension regions 364a–364f is seen to extend to a curved outer periphery engaged by the inwardly disposed surface of a tensioning assembly 366 35 which here is implemented as a tension ring which may be formed of a magnetic or non-magnetic material. Note additionally, that each back iron extension region is formed with back iron abutting surfaces which are formed with a notched shape of obtuse angular profile. For the instant embodiment, this profile is concave with respect to a radius extending from motor axis 342 through the center of a given core component. The back iron abutting surfaces with respect to each core component 354a–354f are shown positioned at opposite sides of a respective back iron extension region 364a–364f at 368a, 369a–368f,369f. A generally angularly shaped back iron assembly represented generally at 370 is completed with the addition of six discrete back iron linking members 372a–372f. Each of those linking members extends between two spaced apart back iron abutting surfaces which are formed with an obtuse angular profile of a convex nature configured to compliment the corresponding abutting surfaces of the back iron extension regions 364a–364f. These profiles are illustrated at 368a, 369a–368f, 369f. With the back iron assembly 370 thus constructed with its discrete components and extension regions, the assembly can be retained in place compressibly by the tension assembly 366. However, as discussed in connection with FIG. 14, the components forming the back iron assembly 370 may be adhesively connected in mutual abutment, but preferably in connection with the tensioning assembly 366 subsequent to the provision of winding components to each of the winding support regions 362a–362f. One such winding component is shown in connection with winding support region 362e at 374, only a sectional portion of these windings being represented in the interest of clarity.

Since certain changes may be made in the above apparatus and method without departing from the scope of the invention herein involved, it is intended that all matter contained in the above description or shown in the accompanying drawings shall be interpreted as illustrative and not in a limiting sense.

What is claimed is:

1. A d.c. motor exhibiting a predetermined torque constant, field winding resistance, functioning air gap radius extending from a motor axis, and operable to a predetermined maximum current, comprising:

a rotor having a sequence of generally arcuate regions of predetermined magnetization and a confronting magnetic surface of principal dimension in parallel with said motor axis, said confronting magnetic surface being located in correspondence with said air gap radius and rotatable about said motor axis;

a stator core assembly having a select number of spaced core components formed of pressure shaped processed ferromagnetic particles which are generally mutually insulatively associated, each said core component being disposed about a radius extending from said motor axis, having a flux interaction surface located adjacent said rotor confronting magnetic surface defining a functioning air gap and having a face length parallel with said motor axis and a face width selected to provide a magnetic field coupling corresponding with a field turn derived said predetermined torque constant and said field winding resistance, each said core component having a winding support region spaced from and in flux transfer communication with said flux interaction surface, having a winding region width generally normal to said radius and cross-sectional area attributes effective for conveyance of confronting magnetic flux without saturation when said motor is operated to said maximum current, and said stator assembly including a back iron assembly formed of pressure shaped processed ferromagnetic particles which are generally mutually insulatively associated, said back iron assembly being in flux transfer association with each said core component adjacent said winding support region and having cross-sectional area attributes effective for magnetic flux conveyance without saturation, said face width having a value less than about 2.5 times said winding region width; and a field winding assembly configured to exhibit said predetermined field winding resistance with said field turns, including winding components located at each said core component and extending in electromagnetic flux coupling relationship about said winding support region, said winding components being controllably electrically excitable for effecting driven rotation of said rotor about said motor axis.

2. The d.c. motor of claim 1 in which:
each said core component flux interaction surface of said stator core assembly has a said face length which is about equal to said principal dimension of said rotor confronting magnetic surface.

3. The d.c. motor of claim 1 in which:
each said core component flux interaction surface of said stator core assembly has a principal dimension in parallel with said motor axis; and
each said core component winding support region has a principal dimension in parallel with said motor axis which is less than said face length of said flux interaction surface.

4. The d.c. motor of claim 3 in which:
said stator assembly back iron assembly has a principal dimension in parallel with said motor axis which is greater than said principal dimension of said winding support region.

5. The d.c. motor of claim 3 in which:
said stator assembly back iron assembly has a principal dimension in parallel with said motor axis which is most equal to the said principal dimension of said winding support region.

6. The d.c. motor of claim 1 in which:
each said core component includes an induction region extending in flux transfer relationship between said flux interaction surface and said winding support region and having a principal dimension in parallel with said motor axis which corresponds with said face length of said flux interaction surface.

7. The d.c. motor of claim 6 in which:
each said core component winding support region has a principal dimension in parallel with said motor axis which is less than said face length of said flux interaction surface.

8. The d.c. motor of claim 7 in which:
each said core component induction region is configured having first and second oppositely disposed, parallel induction region surfaces spaced apart said induction region principal dimension; and
each said core component winding support region is configured having first and second oppositely disposed, mutually parallel winding support region surfaces spaced apart said winding region principal dimension, arranged in parallel relationship and in adjacency with respective said first and second induction region surfaces, and including a first forward coupling transition extending a first forward level-defining distance between said first winding support region surface and said first induction region surface.

9. The d.c. motor of claim 8 in which said forward level-defining distance is of an extent to maintain a said winding component below the level of said first induction region surface.

10. The d.c. motor of claim 8 in which:
each said core component includes a second forward coupling transition extending a second forward level defining distance between said second winding support region surface and said second induction region surface.

11. The d.c. motor of claim 8 in which:
said stator core assembly back iron assembly cross-sectional area has a back iron principal dimension in parallel with said motor axis, is configured having first and second mutually parallel back iron surfaces spaced apart said back iron principal dimension, arranged in parallel relationship and in adjacency with respective said first and second winding support region surfaces.

12. The d.c. motor of claim 11 in which:
said back iron principal dimension is equal to said winding region principal dimension.

13. The d.c. motor of claim 11 in which:
said back iron principal dimension is greater than said winding region principal dimension; and
including a first rearward coupling transition extending a first rearward, level-defining distance between said first winding support region surface and said first back iron surface.

14. The d.c. motor of claim 13 in which said first rearward level-defining distance is of an extent to maintain a said winding component below the level of said first back iron surface.

15. The d.c. motor of claim 13 in which:
each said core component includes a second rearward coupling transition extending a second rearward level-defining distance between said second winding support region surface and said second back iron surface.

16. The d.c. motor of claim 13 in which:
said first back iron surface is arranged in coplanar relationship with said first induction region surface.

17. The d.c. motor of claim 16 in which:
said second back iron surface is arranged in coplanar relationship with said second induction region surface.

18. The d.c. motor of claim 1 in which said stator assembly back iron assembly comprises:
a plurality of discrete back iron linking members each having at least two, spaced apart first back iron abutting surfaces;
a back iron extension region formed integrally with and extending from said winding support region of each said core component to at least two, spaced apart second back iron abutting surfaces arranged in interkeyed, abutting relationship with said first back iron abutting surfaces to define said stator assembly.

19. The d.c. motor of claim 18 in which said stator assembly includes a tensioning assembly surmounting each said core component flux interaction surface for effecting a compressive engagement of said first and second back iron abutting surfaces.

20. The d.c. motor of claim 19 in which said tensioning assembly is a compression ring.

21. The d.c. motor of claim 19 in which said tensioning assembly is a compression ring.

22. The d.c. motor of claim 18 in which said stator assembly includes a tensioning assembly surmounting each said back iron linking member and back iron extension region for effecting a compressive engagement of said first and second back iron abutting surfaces.

23. A d.c. motor system exhibiting a predetermined torque constant, field winding resistance, functioning air gap radius extending from a motor axis and operable to a predetermined maximum current, comprising:
a bearing support assembly;
an air bearing mounted for rotation about said motor axis upon said bearing support assembly;
a rotor having a sequence of generally arcuate regions of predetermined magnetization and confronting surface of first principal dimension in parallel with said motor axis, mounted for rotation with said air bearing, said confronting magnetic surface being located in correspondence with said air gap radius;

a stator core assembly having a select number of spaced core components each being disposed about a radius extending from said motor axis, formed of pressure shaped processed ferromagnetic particles which are generally mutually insulatively associated, each said core component having an induction region of second principal dimension in parallel with said motor axis having a value close in value to the value of said first principal dimension, said induction region extending to an arcuate flux interaction surface located adjacent said rotor confronting magnetic surface to define a functioning air gap and having a face length parallel with said motor axis and an arcuate face width generally normal to said radius, said face length exhibiting said second principal dimension selected to provide a coupling induction of the magnetic flux derived from said rotor regions of predetermined magnetization, each said core component having a winding support region extending in flux transfer communication from said induction region having a third principal dimension parallel with said motor axis, and a winding region width generally normal to said radius, and said stator assembly including a back iron assembly formed of pressure shaped processed ferromagnetic particles which are generally mutually insulatively associated, said back iron assembly being in flux transfer association with each said core component adjacent said winding support region;

a field winding assembly configured with multiple field turns exhibiting said predetermined field winding resistance, said field turns being located at each said core component and extending in electromagnetic flux coupling relationship about said winding support region, said field turns being controllably electrically excitable for effecting driven rotation of said rotor upon said air bearing; and each said core component induction region and winding support region, and said back iron assembly having cross sectional area attributes effective for conveyance of magnetic flux derived from said regions of predetermined magnetization and from said field winding assembly without saturation at said predetermined maximum current.

24. The d.c. motor system of claim 23 in which said face width has a value less than about 2.5 times the value of said winding region width.

25. The d.c. motor system of claim 23 in which:

each said core component induction region is configured having first and second oppositely disposed, parallel induction region surfaces spaced apart said second principal dimension;

said third principal dimension is less than said second principal dimension; and each said core component winding support region is configured having first and second oppositely disposed, mutually parallel winding support region surfaces spaced apart said third principal dimension, arranged in parallel relationship and in adjacency with respective said first and second induction region surfaces, and including a first forward coupling transition extending a first forward level-defining distance between said first winding support region surface and said first induction region surface.

26. The d.c. motor system of claim 25 in which:

said back iron assembly has a fourth principal dimension paralleled with said motor axis; and said second principal dimension is less than said fourth principal dimension.

27. The d.c. motor of claim 25 in which said forward level-defining distance is of an extent to maintain a said winding component below the level of said first induction region surface.

28. The d.c. motor of claim 25 in which:

each said core component includes a second forward coupling transition extending a second forward level defining distance between said second winding support region surface and said second induction region surface.

29. The d.c. motor of claim 25 in which:

said stator core assembly back iron assembly cross-sectional area has a fourth principal dimension in parallel with said motor axis, is configured having first and second mutually parallel back iron surfaces spaced apart said fourth principal dimension, arranged in parallel relationship and in adjacency with respective said first and second winding support region surfaces.

30. The d.c. motor of claim 29 in which:

said fourth principal dimension is equal to said third principal dimension.

31. The d.c. motor of claim 29 in which:

said fourth principal dimension is greater than said third principal dimension; and including a first rearward coupling transition extending a first rearward, level-defining distance between said first winding support region surface and said first back iron surface.

32. The d.c. motor of claim 31 in which said first rearward level-defining distance is of an extent to maintain a said winding component below the level of said first back iron surface.

33. The d.c. motor of claim 31 in which:

each said core component includes a second rearward coupling transition extending a second rearward level-defining distance between said second winding support region surface and said second back iron surface.

34. The d.c. motor of claim 31 in which:

said first back iron surface is arranged in coplanar relationship with said first induction region surface.

35. The d.c. motor of claim 34 in which:

said second back iron surface is arranged in coplanar relationship with said second induction region surface.

36. A d.c. motor, comprising:

a rotor rotatable about a motor axis having a sequence of generally arcuate regions of predetermined magnetization and confronting magnetic surface of first principal dimension in parallel with said motor axis;

a stator core assembly having spaced core components formed of pressure shaped processed ferromagnetic particles which are generally mutually insulatively associated, each said core component having an induction region of second principal dimension in parallel with said motor axis between first and second induction region surfaces and extending to an arcuate flux interaction surface located adjacent said rotor confronting magnetic surface to define a functioning air gap and having a face length parallel with said motor axis of value about equal to said first principal dimension, said induction region extending to an integrally formed winding support region having oppositely disposed first and second support region surfaces spaced apart a third principal dimension less than said second principal dimension, a first forward coupling transition extending a first forward level-defining distance between said first winding support region surface and said first induction region surface, and including a back iron assembly formed of pressure shaped processed ferromagnetic particles which are generally mutually insulatively associated, said back iron assembly being in flux transfer association with each said core component adjacent said winding support region and having a fourth principal dimension parallel with said motor axis extending between first and second spaced apart back iron surfaces; and a field winding assembly including winding components located at each said core component and extending in electromagnetic flux coupling relationship about said winding support region, said winding components being controllably electrically excitable for effecting driven rotation of said rotor about said motor axis.

37. The d.c. motor of claim 36 in which said forward level-defining distance is of an extent to maintain a said winding component below the level of said first induction region surface.

38. The d.c. motor of claim 36 in which:

each said core component includes a second forward coupling transition extending a second forward level defining distance between said second winding support region surface and said second induction region surface.

39. The d.c. motor of claim 36 in which:

said back iron principal dimension is equal to said winding region principal dimension.

40. The d.c. motor of claim 36 in which:

said back iron principal dimension is greater than said winding region principal dimension; and including a first rearward coupling transition extending a first rearward, level-defining distance between said first winding support region surface and said first back iron surface.

41. The d.c. motor of claim 40 in which said first rearward level-defining distance is of an extent to maintain a said winding component below the level of said first back iron surface.

42. The d.c. motor of claim 40 in which:

each said core component includes a second rearward coupling transition extending a second rearward level-defining distance between said second winding support region surface and said second back iron surface.

43. The d.c. motor of claim 40 in which:

said first back iron surface is arranged in coplanar relationship with said first induction region surface.

44. The d.c. motor of claim 43 in which:

said second back iron surface is arranged in coplanar relationship with said second induction region surface.

45. The d.c. motor of claim 36 in which said stator assembly back iron assembly comprises:

a plurality of discrete back iron linking members each having at least two, spaced apart first back iron abutting surfaces;

a back iron extension region formed integrally with and extending from said winding support region of each said core component to at least two, spaced apart second back iron abutting surfaces arranged in interkeyed, abutting relationship with said first back iron abutting surfaces to define said stator assembly.

* * * * *